United States Patent [19]

Faria et al.

[11] Patent Number: 4,684,595

[45] Date of Patent: Aug. 4, 1987

[54] CADMIUM CARBONATE/CADMIUM SULFIDE PHOTOCONDUCTOR

[75] Inventors: Sixdeniel Faria; Ronald E. Karam, both of Towanda, Pa.

[73] Assignee: GTE Products Corporation, Stamford, Conn.

[21] Appl. No.: 593,459

[22] Filed: Mar. 26, 1984

[51] Int. Cl.$^4$ .............................................. G03G 5/04
[52] U.S. Cl. ...................................... 430/94; 430/135
[58] Field of Search ........................ 430/94, 134, 136; 423/561 B

[56] References Cited

U.S. PATENT DOCUMENTS 4,366,222 12/1982 Feinleib .............................. 430/136
4,461,753 7/1984 Suzuki et al. ........................ 430/94

Primary Examiner—John L. Goodrow
Attorney, Agent, or Firm—James Theodosopoulos

[57] ABSTRACT

A cadmium carbonate/cadmium sulfide photoconductor is made by mixing solutions containing carbonate, cadmium and copper ions to form $CdCO_3$:Cu precipitate which is subsequently converted to $CdCO_3/CdS$:Cu by bubbling hydrogen sulfide gas through a hot aqueous suspension of the $CdCO_3$:Cu precipitate.

4 Claims, No Drawings

CADMIUM CARBONATE/CADMIUM SULFIDE PHOTOCONDUCTOR

This invention is concerned with cadmium carbonate/cadmium sulfide photoconductors. Such photoconductors are shown in U.S. Pat. Nos. 4,366,222, 4,275,135, 4,175,955, 4,142,889, 3,867,139, 3,615,401 and British patent No. 1,551,190. The invention is particularly concerned with the manufacture of such photoconductors in which the cadmium carbonate to cadmium sulfide conversion is performed by bubbling hydrogen sulfide gas through a cadmium carbonate suspension, such as is disclosed in U.S. Pat. No. 4,366,222 and British No. 1,551,190. In said patents, the hydrogen sulfide bubbling occurs at room temperature. In our invention, the bubbling is done at an elevated temperature above room temperature. This step, together with other process steps hereafter disclosed, yields a cadmium sulfide/cadmium carbonate photoconductor that does not have the memory problems and degradation problems mentioned in U.S. Pat. Nos. 4,366,222 and 4,275,135.

In our invention, the cadmium carbonate precipitate is formed in a hot aqueous solution and the resultant cadmium carbonate suspension is digested, while hot, to effect nucleation of the cadmium carbonate precipitate and increase the particle size thereof. Subsequently, the time duration of hydrogen sulfide bubbling through a hot cadmium carbonate aqueous suspension must be controlled to yield a photoconductor not subject to degradation.

One example of our invention is as follows. One mole (124 grams) of $Na_2CO_3.H_2O$ is dissolved in 1.5 liters of hot deionized water and filtered through a No. 41 Whatman filter paper. The solution is placed on a hot plate and kept hot at 70° C.

One mole (183.3 grams) of anhydrous cadmium chloride is dissolved in 1.5 liters of hot deionized water and 0.1 gram of anhydrous cupric sulfate is added to the solution which is then filtered and kept at 70° C. The hot cadmium chloride/copper sulfate solution is then added slowly, about 2 ml/second, to the hot sodium carbonate solution while maintaining agitation to yield $CdCO_3$:Cu precipitate which is then digested for one hour at 70° to 80° C. The precipitate is then washed with hot deionized water until the water conductivity is below 50 micromhos. The total aqueous volume is then brought to two liters and, while maintaining the $CdCO_3$:Cu precipitate in suspension in 70° to 80° C. deionized water, hydrogen sulfide gas is bubbled through the suspension through a gas diffuser tube for ten minutes. The resultant $CdCO_3/CdS$:Cu precipitate is then washed with hot deionized water until the water conductivity is below 50 micromhos. After drying for four hours at 130° C., the $CdCO_3/CdS$:Cu is fired at 200° C. for 16 hours in a flowing nitrogen atmosphere. The fired $CdCO_3/CdS$:Cu is then wet sieved through a 355 mesh nylon screen, washed to low conductivity, and then dried at 130° C. for four hours. The resultant $CdCO_3/CdS$:Cu photoconductor operated satisfactorily in copying machines without memory problems or degradation problems.

To prevent degradation problems, the hydrogen sulfide bubbling time should be about ten to twenty minutes per mole of cadmium carbonate per liter.

We claim:

1. In the manufacture of cadmium carbonate/cadmium sulfide photoconductor, the process which includes the steps of precipitating cadmium carbonate from a hot aqueous solution, digesting the cadmium carbonate precipitate to increase the particle size thereof, suspending the increased particle size cadmium carbonate precipitate in hot water to form a cadmium carbonate suspension, and bubbling hydrogen sulfide gas through the hot suspension.

2. The process of claim 1 wherein the hydrogen sulfide gas is bubbled through the hot suspension for about ten to twenty minutes per mole of cadmium carbonate per liter.

3. The process of claim 1 wherein the hydrogen sulfide converts the cadmium carbonate to cadmium carbonate/cadmium sulfide and wherein the cadmium carbonate/cadmium sulfide is subsequently fired at 200° C.

4. The process of making $CdCO_3/CdS$:Cu photoconductor comprising the steps of dissolving a soluble carbonate in water, dissolving a soluble cadmium salt and a soluble copper salt in water, mixing the carbonate, cadmium and copper solution[3] together to form a $CdCO_3$:Cu precipitate, digesting the precipitate in hot aqueous suspension to increase the particle size thereof, washing the digested $CdCO_3$:Cu precipitate, suspending the precipitate in hot water, bubbling hydrogen sulfide gas through the hot suspension for a predetermined time to form $CdCO_3/CdS$:Cu precipitate, and then washing and drying the $CdCO_3/CdS$:Cu and then firing at 200° C.

* * * * *